United States Patent

[11] 3,588,813

| [72] | Inventors | Kennard E. Robinson<br>Box 235, Syracuse, Ind. 46567;<br>Clifford J. Schott, 2004 Hogarth, Toledo,<br>Ohio 43615 |
|---|---|---|
| [21] | Appl. No. | 661,335 |
| [22] | Filed | Aug. 17, 1967 |
| [45] | Patented | June 28, 1971 |

[54] TIRE PRESSURE SIGNAL SYSTEM
4 Claims, 5 Drawing Figs.

| [52] | U.S. Cl. | 340/58 |
|---|---|---|
| [51] | Int. Cl. | B60c 23/04 |
| [50] | Field of Search | 340/58 |

[56] References Cited
UNITED STATES PATENTS

| 2,727,221 | 12/1955 | Sprigg | 340/58 |
|---|---|---|---|
| 2,846,664 | 8/1958 | Amundsen, Jr., et al. | 340/58 |
| 3,430,196 | 2/1969 | Dalton | 340/58 |

*Primary Examiner*—John W. Caldwell
*Assistant Examiner*—Howard S. Cohen
*Attorney*—Hauke, Krass and Gifford ABSTRACT: A tire pressure sensing device comprising a housing with a floating spring-biased piston movable between axial positions corresponding to normal and abnormal tire pressures is mounted within the profile of the wheel rim supporting the tire. A flexible diaphragm having one side exposed to tire pressure and its opposite side engaging the piston urges the piston into abutment with an electrical contact when an abnormal pressure condition exists to close an electrical circuit having a warning light.

Patented June 28, 1971
3,588,813
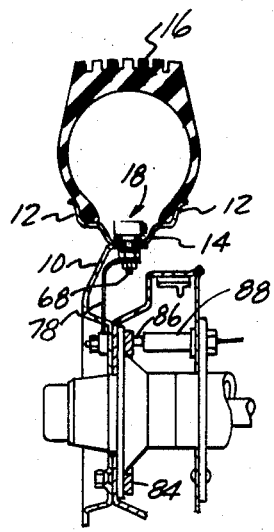
FIG.1
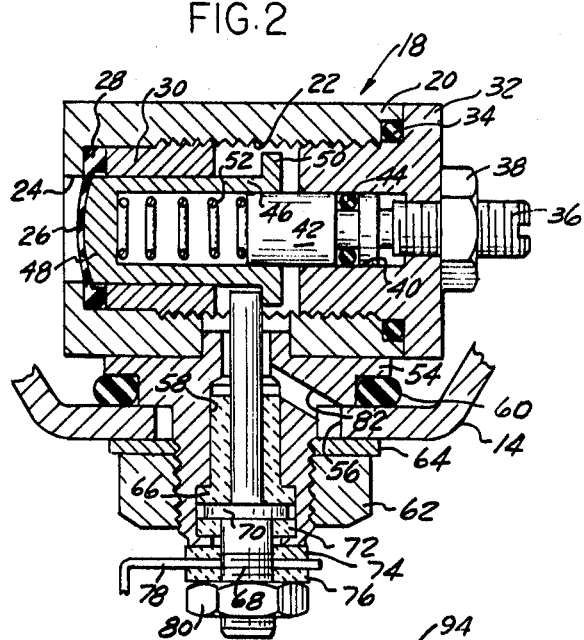
FIG.2
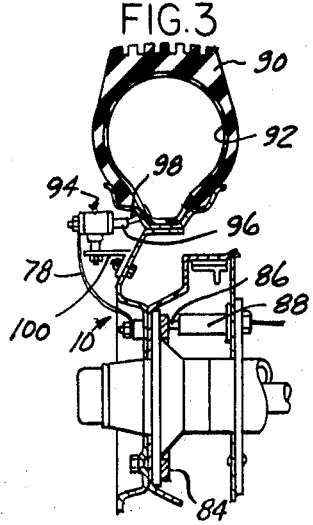
FIG.3
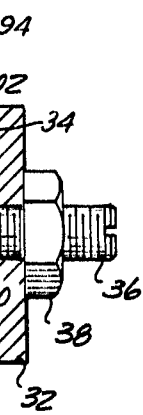
FIG.4
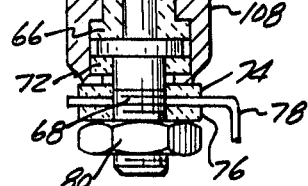
FIG.5
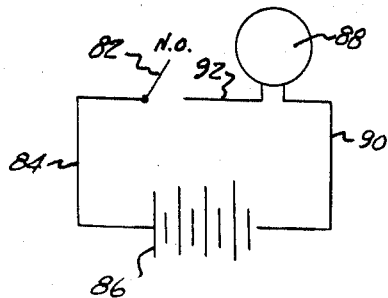
INVENTORS
CLIFFORD J. SCHOTT
KENNARD E. ROBINSON
BY Hauke, Kruse, & Gifford
ATTORNEYS

TIRE PRESSURE SIGNAL SYSTEM

BACKGROUND OF THE INVENTION

1. Field Of The Invention

This invention relates to systems for producing a signal in response to an abnormal pressure existing within a vehicle tire and more specifically to a compact pressure sensing device which may be mounted either interiorly or exteriorly of the vehicle tire and operative to energize a warning signal when an abnormal pressure condition exists within the tire.

2. Description Of The Prior Art

Numerous devices have been disclosed in the prior art which have as their object the warning of the vehicle's operator that an abnormal pressure condition exists in one or more of the vehicle's tires. Devices of this character have utility not only as a safety feature for high speed automotive vehicles and aircraft landing wheels but in addition provide means for the owners of large fleets of vehicles such as trucks, buses and the like to achieve a maximum tire wear-out life that is associated with proper inflation.

Tire signaling devices of the prior art have included various electricomechanical arrangements for signaling by audio or visual means a variation in the tire pressure to the operator of the vehicle. Such devices have received a relatively poor commercial acceptance because of their complexity, unreliability, size and economic considerations.

It is the broad purpose of the present invention to provide a tire pressure signal system employing a reliable, compact, pressure sensing device which readily lends itself for mounting either within the wheel and tire of a tubeless tire assembly or exteriorly of the tire for those vehicles employing an inner pneumatic tube and which can be readily adapted to automotive vehicles including trucks, buses and aircraft vehicles both military and commercial.

SUMMARY

The preferred embodiment of the present invention, which will be subsequently described in greater detail, includes a pressure sensing device which forms a compact, reliable assembly that can be mounted within the profile defined by the wheel rims so that in the event the tire loses its air pressure and the vehicle is substantially rotating on the wheel rims, the device will not come into contact with the tire and reduce its life or damage the device.

The preferred pressure sensing device comprises a housing mounted on the wheel. A diaphragm having its outer side exposed to the pressure within the tire closes the end of the housing. A spring-biased piston reciprocally mounted within the housing engages the inner side of the diaphragm so that as the diaphragm flexes in response to pressure changes within the tire, the piston is displaced from a normal to an abnormal position. An annular flange carried by the piston within an annular recess in the housing abuts a rod-like terminal extending into the annular recess when the piston is displaced to an axial position associated with an abnormal tire pressure. Abutment between the flange and the terminal closes an electrical signaling circuit so that the operator of the vehicle is warned, preferably through a warning light, that an abnormal pressure condition exists.

The diaphragm has a thickened perimetrical edge which is sandwiched between a narrow annular shoulder of the housing and a bushing disposed within the housing so that the diaphragm functions not only as an actuating member but provides an air tight seal between the tire and the atmosphere.

The piston flange and the terminal provide a novel switch means for actuating the signaling circuit. The piston is of a light weight construction and mounted so that as the tire commences to lose pressure, the flange of the piston initially approaches and vibrates against the rodlike terminal to provide an intermittent energizing of the signaling circuit so that the vehicle's operator is made aware of the abnormal condition because of the flickering condition of the signaling light. This flickering condition continues until the tire pressure has lost sufficient air that the spring-bias means acting on the piston urges the annular flange of the piston into positive abutment with the terminal so that the driver receives a steady, visual warning. The housing is preferably mounted so that the piston moves along an axis which is parallel to the axis of rotation of the wheel, thereby eliminating the effects of centrifugal force as the wheel rotates.

It is therefore an object of the present invention to provide an improved, compact, pressure-responsive signaling device for pneumatic tires which can be mounted on a wheel assembly and within the profile defined by the tire-engaging rims so that in the event the tire loses its normal air pressure, the pressure sensing unit will not come into contact with the tire as the tire deflates.

Another object of the present invention is to provide an improved pressure responsive signaling device for pneumatic tires having a few basic components permitting it to be readily adapted to tires employing pneumatic inner tubes as well as the tubeless variety.

Still another object of the present invention is to provide an improved pressure-sensing unit for a low pressure tire signaling system which takes the form of a balanced piston reciprocally mounted for movement along an axis parallel to the axis of rotation of the wheel assembly and selectively biased in one direction by spring means and the opposite direction by tire pressure, with the spring means causing the piston to move into a circuit closing relationship with a terminal upon the loss of tire pressure thereby actuating signal means disposed in the circuit.

Still another object of the present invention is to provide an improved actuating diaphragm for a tire pressure sensing device having a thickened perimetrical edge to provide means for rigidly holding the periphery of the diaphragm in place.

Still further objects and advantages of the present invention will become apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a sectional view through a tubeless tire wheel assembly with a pressure sensing device built in accordance with the present invention mounted within the profile of the wheel rims;

FIG. 2 is an enlarged longitudinal sectional view through the preferred pressure sensing unit;

FIG. 3 is a sectional view through a vehicle tire assembly employing a pneumatic inner tube with another embodiment of the invention mounted on the wheel and exteriorly of the tire;

FIG. 4 is a longitudinal sectional view through the pressure sensing unit of FIG. 3 and illustrating the interchangeable components between the tubeless and tube-type devices; and FIG. 5 is a schematic view of the preferred electrical circuit for practicing the invention.

DESCRIPTION OF THE PREFERRED EMBODIMENTS

The preferred embodiments of the invention are described first with reference to a conventional tire assembly employing a pneumatic, tubeless tire. A second embodiment of the invention illustrates how the preferred sensing pressure device can be employed with a vehicle tire assembly employing a pneumatic inner tube. It is to be understood that the preferred embodiments can be employed with either automotive or aircraft tires, trucks, buses and the like and both commercial and military vehicles as a safety feature to warn the operator of the vehicle that an unsafe tire pressure condition exists in sufficient time for the operator to take corrective measures.

The preferred embodiments are described with reference to a system for detecting an under inflated tire condition and which responds to this condition by energizing a warning device such as a signal light. However, the preferred system could be readily adapted to energize a signaling means to indicate that an overly inflated tire condition exists.

Now referring to FIGS. 1 and 2, a vehicle wheel 10 is shown having a pair of spaced annular rims 12 connected by a center section 14 having a reduced diameter. A tubeless tire 16 is mounted on the wheel 10. The inner periphery or beads of the tire 16 are mounted on the rims 12 in accordance with the usual practice.

A pressure sensing unit generally indicated at 18 is mounted on the center portion 14 and within the profile defined by the center portion 14 and rims 12. The pressure sensing unit 18 is mounted within the interior side of the tire 16 thereby eliminating the necessity for a separate pneumatic connection with the tire 16.

As can best be seen in FIG. 2, the pressure sensing unit 18 comprises a tubular housing 20 having a partially threaded bore 22 terminating with a narrow open end 24. The bore 22 and the narrow open end 24 are connected by an annular shoulder for seating a circular flexible diaphragm 26. The diaphragm 26 has a thickened perimetrical edge 28 and a diameter corresponding to the bore 22. A bushing 30 mounted within the housing 20 bears against the inner side of the perimetrical edge 28 so that the diaphragm 26 is tightly sandwiched in position. The diaphragm 26 thereby provides a fluidtight seal between its inner and outer sides. The outer side of the diaphragm 26 is exposed to the air pressure within the tire 16.

A threaded plug 32 closes off the opposite end of the housing 20 while an O-ring 34 provides a fluidtight seal between the housing 20 and the plug 32.

A threaded element 36 is mounted on the plug 32 and can be adjusted by a screw driver at a selected longitudinal position relative to the diaphragm 26 and locked in place by a nut 38.

The plug 32 has an inner cylindrical cavity 40 on the longitudinal axis of the bore 22 of the housing. A cylindrical guide section 42 carried at the inner end of element 36 is slidably mounted in the cylindrical cavity 40 and an O-ring 44 provides a fluidtight seal between the element 36 and the plug 32. The guide section 42 provides a guideway for a piston 46 having a generally tubular configuration. The piston 46 has a generally convex, closed head 48 in abutment with the inner side of the diaphragm 26. The opposite end of the piston 46 has an annular flange 50.

A spring 52 is disposed within the piston 46 with one end acting against the head 48 and its opposite end acting against the end of the guide section 42. Thus it can be seen that the spring 52 can be selectively pretensioned by adjusting the set screw 36 thereby providing means for varying the force with which the piston 46 acts against the diaphragm 26 in opposition to the tire pressure.

The piston 46 is axially slidably mounted in the bore of the bushing 30. The bushing 30 has a length less than the piston 46 so that an annular space is defined between the inner end of the bushing 30 and the inner end of the threaded plug 32 wherein the flange 50 of the piston can reciprocate.

A retainer 54 carried by the housing 20 extends through an aperture 56 in the center portion 14 of the wheel and has a bore 58 connected to the interior of the housing 20. The housing 20 is mounted so that the piston 46 is movable along an axis which is parallel to the axis of rotation of the wheel assembly 10 and the bore 58 of the retainer 54 preferably extends radially toward the axis of rotation of the wheel assembly.

An annular seal 60 disposed between the retainer 54 and the center portion of the wheel 14 provides a fluidtight seal between the retainer 54 and the wheel. The outer end of the retainer 54 is externally threaded so that a nut 62 and a washer 64 can tightly mount the pressure sensing device on the wheel and within the tire 16.

A fiber insulating sleeve 66 in the bore 58 provides means for supporting a rodlike terminal 68. An annular flange 70 of the terminal 68 seats against the outer end of the insulating sleeve 66. A fiber washer 72 separates the flange 70 from the retainer 54. A fiber washer 74 and a steel washer 76, mounted on the threaded end of the terminal 68 sandwich an electrical lead wire 78 and are retained in place by a nut 80. This mounting arrangement electrically insulates the terminal 68 and the lead wire 78 from the other components of the pressure sensing device so that the inner end of the terminal 68 functions as a fixed contact of an electrical switch. The flange 50 of the piston functions as a movable contact of an electrical switch and is normally spaced from the end of the terminal 68 to form a normally open switch.

In operation, the element 36 is adjusted so that the spring 52 is pretensioned 66 produce a force on the piston less than the 78 produced by a normal tire pressure acting through the diaphragm 26. This adjustment is normally made when the tire 87 is in a 99 condition with the flange 50 abutting the terminal 68. The pressure within the tire 16 is then increased to its normal level which causes the diaphragm 26 to flex inwardly sufficiently to displace the piston 46 in a direction away from the diaphragm and separating the flange 50 from the terminal 68 to an open circuit condition.

Referring to FIG. 5, for an illustrative electrical circuit, the flange 50 and the terminal 68 form a normally open switch 82 with the body of the vehicle forming an electrical line 84 to a battery 86 of the vehicle. A warning light 88 preferably mounted in the operator's compartment of the vehicle is connected to the battery by a line 90 and the switch 82 by a line 92.

When the air pressure in the tire 16 deflates to an abnormal level, the diaphragm 26 flexes outwardly so that the piston 46 under the influence of the spring 52 moves with the diaphragm until the flange 50 abuts the terminal 68 to close the electrical circuit and energize the light 88. It has been found that normally the pressure within the tire will deflate at a fairly slow level so that initially the contact between the flange 50 and the terminal 68 is of an intermittent nature. this is because the cylindrical surface of the terminal 68 and the flange 50 forms a line contact rather than a surface to surface contact. Thus the initial engagement between the flange 50 and the terminal 68 provides an intermittent energizing of the electrical circuit so that the light 88 flickers. This flickering condition assists in attracting the attention of the vehicle's operator to the abnormal pressure condition so that he can take corrective measures. Further deflation of the tire 16 permits the spring 52 to apply a sufficient force on the piston so that a positive engagement is established between the flange 50 and the terminal 68 so that the warning light 88 provides a continuous, visual signal.

By mounting the piston 52 for movement along an axis parallel to the axis of rotation of the wheel 10, the effects of centrifugal force are obviated thereby permitting the piston 46 to be evenly balanced between the forces produced by the pressure within the tire and the spring 52.

In order to compensate for the movement of the piston 46 and the changing volume within the housing 20, a vent 82 in the retainer 54 provides communication between the interior of the housing 20 and the atmosphere through the aperture 56 in the wheel assembly.

FIG. 1 illustrates a typical means for forming an electrical circuit from the terminal 68 to the vehicle. This essentially consists of an annular insulated ring 84 mounted on the rotating part of the wheel and a spring loaded electrical brush 86 mounted with a tubular housing 88 which is carried by a relatively fixed part of the brake housing. This construction shown but one of many possible methods for establishing an electrical circuit between a moving and a relatively fixed element.

FIGS. 3 and 4 illustrate how the preferred pressure sensing device can be mounted on the wheel assembly 10 on which is mounted a tire 90 having an air inflated inner tube 92. In this embodiment the pressure sensing device 94 illustrating the invention is mounted exteriorly of the tire and is preferably connected by a conduit 96 which forms a pneumatic connection with a valve 98 of the inner tube which extends through the wheel rim. The pressure sensing device 94 is mounted by a bracket 100 on the wheel 10.

In this form of the invention a housing 102 replaces the housing 20. Housing 102 is substantially similar to housing 20 with the exception that an annular extension 104 provides means for connecting the conduit 96. The housing 102 has a reduced section 106 which provides a seat for the diaphragm 26. The bushing 30 is threadably mounted within the housing 102 and sandwiches the thickened perimetrical edge 28 of the diaphragm in position so that there is an airtight seal between the opposite sides of the diaphragm 26. The piston 46 is mounted within the housing with its closed end 48 engaged with the inner side of the diaphragm 26.

The guide section 42 is mounted in the threaded plug 32 which closes off the opposite end of the housing 102. The section 42 has its outer end 36 threadably mounted to the plug 32 and locked in place by the nut 38. By adjusting the guide section 42, the spring 52 is pretensioned so that the piston 46 will move into engagement with the terminal 68 at a predetermined variation of the pressure within the inner tube 92 from a normal pressure level. Because the pressure sensing unit illustrated in FIGS. 3 and 4 is mounted exteriorly of the pneumatic inner tube there is no necessity for the various seals required in the embodiment illustrated in FIG. 1 and 2. An adapter 108 mounted on the housing 102 extending at right angles to the movement of the piston 46 provides means for mounting the terminal 68. The terminal 68 is insulated from the other components of the unit by the fiber sleeve 66 and the fiber washers 72 and 74. The piston 46 is preferably mounted so that it moves on an axis parallel to the axis of rotation of the wheel assembly.

A vent 110 communicates with the annular interior portion of the housing 102 in which the flange 50 reciprocates to the atmosphere to compensate for the variable volume behind the piston.

The embodiment illustrated in FIGS. 3 and 4 functions essentially the same as the embodiment illustrated in FIGS. 1 and 2 and illustrates how the various components with the exception of the housing are interchangeable for mounting on either tubeless and tube tires.

Although we have described but two preferred embodiments of our invention, it is to be understood that various changes and revisions can be made therein without departing from the spirit of the invention as expressed in the scope of the appended claims.

We claim:
1. A tire pressure signal system for a vehicle having a pneumatic tire mounted on a wheel, comprising:
  a housing having a bore with an annular enlargement formed therein, said wheel having a central annular portion merging radially outwardly into a pair of annular rims for engaging the inner periphery of said tire, and said housing being mounted on said central annular portion within the profile defined by said central annular portion and said rims and with the axis of elongation of said bore parallel to the axis of rotation of said wheel;
  a diaphragm disposed within said bore and closing one end thereof;
  means providing a pneumatic connection between the outer side of said diaphragm and the pressure within said tire so that said diaphragm flexes in response to a pressure change in said tire;
  a terminal extending into said annular enlargement;
  a piston axially slidably disposed in said bore with a head engaged with the inner side of said diaphragm, said piston having an annular flange disposed in said annular enlargement;
  a guide member mounted on said housing and concentric with said bore and having means for adjusting said guide member at a selected spacing relative to said diaphragm, and said piston having a bore complimentary to said guide member and slidably engaged with said guide member;
  a spring disposed in the bore of said piston between said guide member and the head of said piston so that said guide member provides means for selectively varying the bias of said spring, said spring yieldably urging said piston toward said diaphragm so that said piston is displaced by the flexing of said diaphragm between a first position wherein said annular flange is axially spaced from said terminal and associated with a normal tire pressure, and a second position wherein said annular flange abuts said terminal and associated with an abnormal tire pressure; and
  signal means responsive to the engagement of the annular flange of said piston against said terminal.

2. The system as defined in claim 1, wherein said signal system means comprises:
  a. a normally open electrical circuit;
  b. a signal in the circuit responsive to closing of the circuit;
  c. said terminal and said piston forming a switch in said circuit and operative to close said circuit when said annular flange and said terminal are in abutment.

3. The system as defined in claim 1, wherein said housing has a reduced section defining an annular shoulder adjacent one end of said bore, and said diaphragm has a thickened perimetrical edge mounted against said shoulder, and including a bushing mounted within said bore, the thickened perimetrical edge of said diaphragm being sandwiched between the end of said bushing and said annular shoulder to form a fluidtight seal between opposite sides of said diaphragm.

4. The system as defined in claim 1, wherein said housing includes an aperture formed therein communicating between the interior of said housing and the atmosphere.

UNITED STATES PATENT OFFICE
CERTIFICATE OF CORRECTION

Patent No. 3,588,813                    Dated      June 28, 1971

Inventor(s)   Kennard E. Robinson & Clifford J. Schott

It is certified that error appears in the above-identified patent and that said Letters Patent are hereby corrected as shown below:

IN THE SPECIFICATION:

Col. 4, line 16, change "66" to --to-- line 17, change "78" to --force-- line 19, change "87" to --16-- line 19, change "99" to --deflated-- line 40, change ". this" to --.  This-- line 69, change "shown" to --shows--

Signed and sealed this 22nd day of February 1972.

(SEAL)
Attest:

EDWARD M. FLETCHER, JR.          ROBERT GOTTSCHALK
Attesting Officer                Commissioner of Patents